United States Patent
Landmann

(10) Patent No.: US 9,804,050 B2
(45) Date of Patent: Oct. 31, 2017

(54) SYSTEMS AND METHODS FOR SENSOR DRIFT COMPENSATION

(71) Applicant: Wolf S. Landmann, Fair Lawn, NJ (US)

(72) Inventor: Wolf S. Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 607 days.

(21) Appl. No.: 14/211,623

(22) Filed: Mar. 14, 2014

(65) Prior Publication Data

US 2014/0278185 A1 Sep. 18, 2014

Related U.S. Application Data

(60) Provisional application No. 61/783,664, filed on Mar. 14, 2013.

(51) Int. Cl.
  *G01L 27/00* (2006.01)
  *G01K 15/00* (2006.01)
  *G01K 1/20* (2006.01)

(52) U.S. Cl.
  CPC .............. *G01L 27/005* (2013.01); *G01K 1/20* (2013.01); *G01K 15/005* (2013.01)

(58) Field of Classification Search
  CPC .................................... G01K 1/20; G01K 1/26
  See application file for complete search history.

(56) References Cited

U.S. PATENT DOCUMENTS

| | | | | |
|---|---|---|---|---|
| 4,598,381 A | * | 7/1986 | Cucci | G01L 9/125 702/138 |
| 4,817,022 A | * | 3/1989 | Jornod | G01L 13/025 702/98 |
| 5,024,100 A | * | 6/1991 | Weinstein | G01L 19/083 73/724 |
| 5,542,285 A | * | 8/1996 | Merilainen | G01N 21/3504 250/343 |
| 5,686,826 A | * | 11/1997 | Kurtz | G01L 1/2281 323/365 |

(Continued)

*Primary Examiner* — John Breene
*Assistant Examiner* — Eyob Hagos
(74) *Attorney, Agent, or Firm* — Troutman Sanders LLP; James E. Schutz; Mark Lehi Jones

(57) ABSTRACT

An exemplary embodiment of the present invention provides systems and methods of compensating sensor drift. In one example embodiment, a system may comprise a primary sensor having a primary full-scale range and configured to output a primary environmental condition signal indicative of an environmental condition; a reference sensor having a reference full-scale range and configured to output a reference environmental condition signal indicative of the environmental condition, wherein the reference full-scale range is less than the primary full-scale range; and a drift compensation system configured to determine a drift compensation signal using the primary environmental signal and the reference environmental condition signal responsive to the reference environmental conditional signal being in the reference full-scale range and compensate the primary environmental condition signal using the drift compensation signal.

16 Claims, 2 Drawing Sheets

(56) References Cited

U.S. PATENT DOCUMENTS

| | | | | |
|---|---|---|---|---|
| 6,047,244 A | * | 4/2000 | Rud, Jr. | G01D 3/024 |
| | | | | 375/295 |
| 6,237,394 B1 | * | 5/2001 | Harris | G01D 3/022 |
| | | | | 702/104 |
| 2008/0300810 A1 | * | 12/2008 | Seesink | G01D 3/0365 |
| | | | | 702/85 |
| 2012/0078563 A1 | * | 3/2012 | Grabinger | F24F 11/006 |
| | | | | 702/104 |
| 2013/0223472 A1 | * | 8/2013 | Maston | G01K 15/00 |
| | | | | 374/2 |
| 2013/0333440 A1 | * | 12/2013 | Hedtke | G01L 27/007 |
| | | | | 73/1.57 |

\* cited by examiner

SYSTEMS AND METHODS FOR SENSOR DRIFT COMPENSATION

CROSS-REFERENCE TO RELATED APPLICATIONS

This application claims priority under 35 U.S.C. §119(e) to U.S. Prov. App. No. 61/783,664, entitled "SYSTEMS AND METHODS FOR SENSOR DRIFT COMPENSATION," filed Mar. 14, 2013, which is hereby incorporated by reference as if fully set forth herein.

TECHNICAL FIELD OF THE INVENTION

The various embodiments of the present disclosure relate generally to sensor transducers. More particularly, various embodiments of the present invention are directed to systems and methods for compensating the drift experienced by a sensor transducer.

BACKGROUND OF THE INVENTION

Sensors are used in numerous applications to measure different characteristics of an environment, including, but not limited to, pressure, temperature, and the like. Unfortunately, over time, sensor properties may degrade leading to less reliable measurements. This is commonly referred to as sensor drift, which can be defined as the change in the output of a transducer over time under constant input. For example, a pressure transducer exposed to a fifty (50) PSI environment may initially provide an output indicative of a measurement of fifty (50) PSI. Over time, even when exposed to the same fifty (50) PSI environment, the pressure transducer's output may change to indicate other measurements, e.g., forty-eight (48) PSI.

Sensor drift can usually be expressed as a percentage of the full scale range of a sensor. Unfortunately, sensor drift can often approach or even exceed about 0.1% or 0.2% of the sensors full scale range. This means that for a one thousand (1,000) PSI sensor, sensor drift can cause output variations greater than two (2) PSI. Therefore, sensor drift can be problematic for many applications, especially those applications where reliable sensor measurements are required.

A conventional technique for compensating for sensor drift in differential sensors—sensors measuring difference in a property, e.g., pressures at two different locations—is to zero the outputs of the sensors before they are placed into use or at various times during use. Unfortunately, this technique is useless for absolute sensors or for differential sensors that never go to zero.

Accordingly, there is a desire for improved systems and methods for compensating for sensor drift. Various embodiments of the present invention address this desire.

SUMMARY OF THE INVENTION

Briefly described, embodiments of the present disclosure relate to sensor drift compensation. In one example embodiment, a system may be configured to include a primary sensor, a reference sensor and a drift compensation system. The primary sensor may be configured to output a primary environmental condition signal indicative of an environmental condition. Further, the primary sensor may have a primary full-scale range. The reference sensor may be configured to output a reference environmental condition signal indicative of the environmental condition. Also, the reference sensor may have a reference full-scale range that may be less than the primary full-scale range. In response to the reference environmental conditional signal being in the reference full-scale range, the drift compensation system may be configured to determine a drift compensation signal using the primary environmental signal and the reference environmental condition signal. Further, the drift compensation system may be configured to compensate the primary environmental condition signal using the drift compensation signal.

In another example embodiment, a method may include outputting, by a primary sensor having a primary full-scale range, a primary environmental condition signal indicative of an environmental condition. Further, the method may include outputting, by a reference sensor having a reference full-scale range, a reference environmental condition signal indicative of the environmental condition. The reference full-scale range may be less than the primary full-scale range. Further, in response to the reference environmental conditional signal being in the reference full-scale range, the method may include determining, by a drift compensation system, a drift compensation signal using the primary environmental signal and the reference environmental condition signal. Finally, the method may include compensating, by the drift compensation system, the primary environmental condition signal using the drift compensation signal.

BRIEF DESCRIPTION OF THE DRAWINGS

The following Description of the Invention is better understood when read in conjunction with the appended drawings. For the purposes of illustration, there is shown in the drawings exemplary embodiments, but the subject matter is not limited to the specific elements and instrumentalities disclosed.

DESCRIPTION OF THE INVENTION

Figure 1:
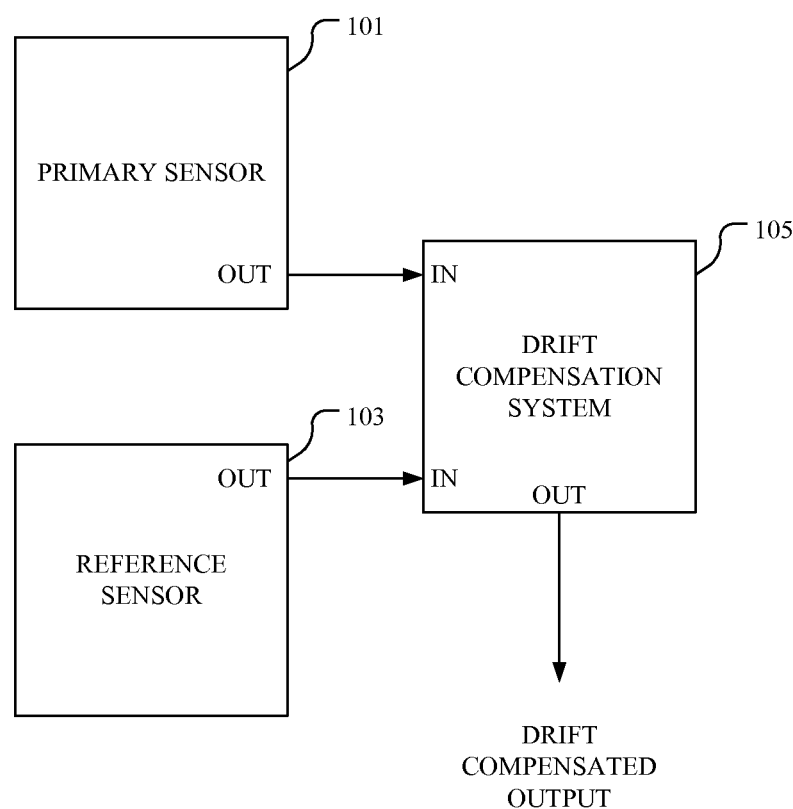
FIG. 1 is a block diagram of a sensor drift compensation system, in accordance with an exemplary embodiment of the present invention.

To facilitate an understanding of the principles and features of the present invention, various illustrative embodiments are explained below. To simplify and clarify explanation, the invention is described below as relating to a pressure sensor drift compensation system. One skilled in the art will recognize, however, that the invention is not limited to pressure sensors, but instead, the various embodiments of the present invention also find application for use with other sensor-types, including, but not limited to, temperature sensors, light sensors, audio sensors, and the like.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents that operate in a similar manner to accomplish a similar purpose.

The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. Ranges may be expressed herein as from "about," "substantially," or "approximately" one particular value or to "about," "substantially," or "approximately" another particular value. When such a range is expressed, another embodiment includes from the one particular value or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

As discussed above, the drift exhibited by a sensor is typically a fraction of the full scale range of the sensor. Therefore, if two sensors—a first sensor with a one thousand (1,000) PSI range and a second sensor with a fifty (50) PSI range—each experience 0.2% drift, the first sensor may exhibit drift on the order of about two (2) PSI while the second sensor may exhibit drift on the order of about 0.1 PSI. Accordingly, if both sensors are measuring a pressure within the range of the second sensor—less than fifty (50) PSI—then the second sensor may provide a much more accurate output. Specifically, while the first sensor may be accurate within two (2) PSI, the second sensor may be accurate within 0.1 PSI. The present invention recognizes this characteristic and uses it to compensate for sensor drift.

As shown in FIG. 1, an exemplary embodiment of the present invention provides a sensor drift compensation system 100. The system 100 comprises a primary sensor 101, a reference sensor 103, and a drift compensation system 105.

The primary sensor 101 can be positioned to measure a characteristic of an environment. The reference sensor 103 can also be positioned to measure the characteristic of the environment. In an exemplary embodiment of the present invention, the primary sensor 101 and the reference sensor 103 can be pressure sensors. In an exemplary embodiment of the present invention, the primary sensor 101 and the reference sensor 103 can be collocated in order to ensure both sensors 101 and 103 are exposed to substantially identical conditions.

The primary sensor 101 can have a primary full scale range. The reference sensor 103 can have a reference full scale range less than the primary full scale range. For example, in an exemplary embodiment of the present invention, the primary sensor 101 can have a seven hundred and fifty (750) PSI full scale range, and the reference sensor 103 can have a fifty (50) PSI full scale range. Those skilled in the art would understand, however, the invention is not so limited. Instead, the primary sensor 101 and the reference sensor 103 can have many different full scale ranges in accordance with various embodiments of the present invention.

The primary sensor 101 can provide a primary output. The reference sensor 103 can provide a reference output. The primary output and the reference output can be received by the drift compensation system 105.

Figure 2:
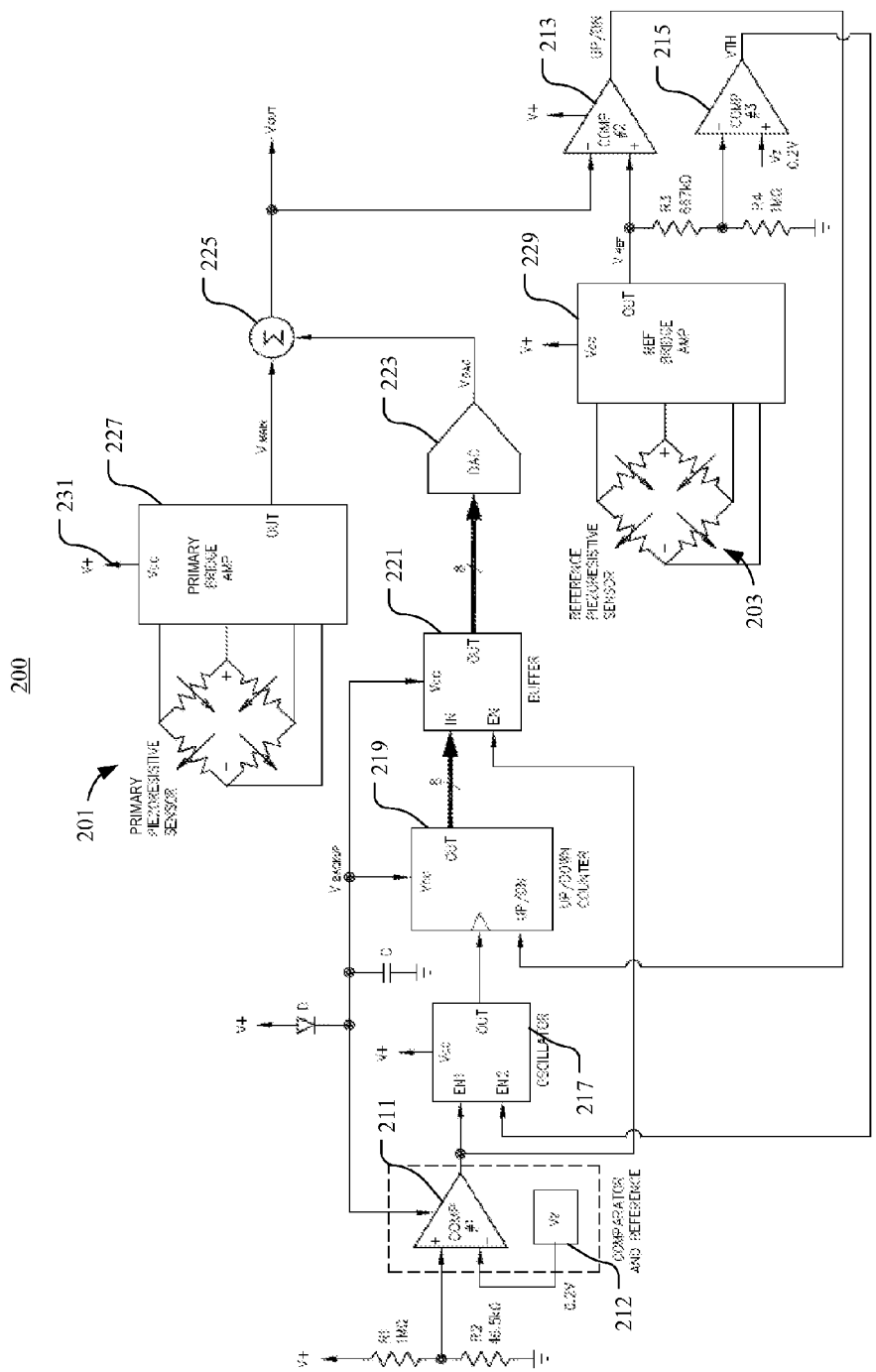
FIG. 2 is a circuit diagram of a sensor drift compensation system, in accordance with an exemplary embodiment of the present invention.

The drift compensation system 105 can take many forms in accordance with various embodiments of the present invention such as a drift compensation circuit. An exemplary drift compensation circuit 200 is shown in FIG. 2, which will be discussed below.

In another exemplary embodiment of the present invention, the drift compensation system 105 can comprise a processor and memory that together perform a drift compensation method. The processor and memory can take many forms in accordance with various embodiments of the present invention. For example, the memory may store logical instructions that can be executed by the processor to perform the various actions described herein. The processor can include any number of processors, controllers, integrated circuits, programmable logic devices, or other computing devices and resident or external memory for storing data and other information accessed or generated by the system. The processor may implement a computer program or code segments stored on memory to perform some the functions described herein. The computer program can be embodied in any computer-readable medium (e.g., memory) for use by or in connection with an instruction execution system, apparatus, or device, and execute the instructions. Memory may contain, store, communicate, propagate or transport the program for use by or in connection with the instruction execution system, apparatus, or device. Examples of memory may include an electrical connection having one or more wires, a random access memory (RAM), a read-only memory (ROM), an erasable, programmable, read-only memory (EPROM or Flash memory), a portable computer diskette, or a portable compact disk read-only memory (CDROM). Memory may include, for example, removable and non-removable memory elements such as RAM, ROM, Flash, magnetic, optical, USB memory devices, or other conventional memory elements.

The drift compensation system 105 can be configured to compensate the drift experienced by the primary sensor 101 based on measurements from the reference sensor 103. As explained above, when measuring a value within the reference full scale range, the reference sensor 103 may provide a more accurate output than the primary sensor 101 because the primary sensor 101 has a larger full scale range. Accordingly, in an exemplary embodiment of the present invention, the drift compensation system 105 determines a compensation value used to adjust the output of the primary sensor 101 so that it is substantially equal to the output of the reference sensor 103. In some embodiments of the present invention, the compensation value can be continually updated during operation of the sensor 101 to provide for automatic drift compensation. In some embodiments of the present invention, the drift compensation system 105 only determine or updates the compensation value when the reference sensor 103 and the primary sensor 101 are measuring a condition within the reference full scale range.

For example, consider the situation described above where the primary sensor 101 has a primary full scale range of seven hundred and fifty (750) PSI, and the reference sensor 103 has a reference full scale range of fifty (50) PSI. Both sensors 101 and 103 can be positioned to monitor an actual pressure of the same environment. The output of both sensors 101 and 103 can be received by a drift compensation system 105. The drift compensation system 105 can determine/calculate a compensation value so long as the actual pressure is less than (or less than or equal to) fifty (50) PSI—within the range of the reference sensor 103. Because the reference sensor 103 typically provides a more accurate output than the primary sensor 101 for the reasons explained above, the drift compensation system 105 can determine a compensation value used to adjust an output of the primary sensor 101 so that it is equal to an output of the reference sensor 103. The drift compensation system 105 can continue or begin to update/calculate the compensation value when the actual pressure is within the reference full scale range. If the actual pressure exceeds the reference full scale range—fifty (50) PSI—the drift compensation system 105 can stop updating the compensation value, and the compensation value can then be used to adjust the output of the primary sensor 101 for actual pressure values outside the range of the reference signal. When the actual pressure returns to within the reference full scale range, the drift compensation system 105 can resume updating the compensation value. As shown in FIG. 1, the drift compensation system 105 can use the compensation value to adjust the output of the primary sensor 101 and provide a zero drift compensated output for the primary sensor 101.

As stated above, FIG. 2 provides the drift compensation circuit 200 in accordance with an exemplary embodiment of the present invention. The circuit 200 comprises a first comparator 211, a second comparator 213, a third comparator 215, an oscillator 217, a counter 219, a buffer 221, a reference voltage ($V_Z$), a digital-to-analog converter 223, an adder 225, a primary (main) sensor 201 coupled to a primary (main) amplifier 227, a reference sensor 203 coupled to a reference amplifier 229, and a supply voltage ($V_+$) 231.

The first comparator 211 is coupled to the supply voltage ($V_+$) 231 and detects when the supply voltage ($V_+$) 231 falls below a threshold. In an exemplary embodiment of the present invention, the supply voltage ($V_+$) 231 can be about five volts (5.0 V). In an exemplary embodiment of the present invention, the first comparator 211 can detect when the supply voltage ($V_+$) 231 falls below about four and eight-tenths volts (4.8 V).

The second comparator 213 can receive the drift compensated output from the adder 225 and the output of the reference amplifier 229. The second comparator 213 can determine whether the drift compensated output from the adder 225 is less than, greater than, or equal to the output of the reference amplifier 229.

The third comparator 215 is electrically coupled to the output of the reference amplifier 229 (via resistor R3) and the reference voltage ($V_Z$) 212. The third comparator 215 can indicate when the actual pressure experienced by the reference sensor 203 is outside of its full scale range.

The oscillator 217 can have two enable inputs. A first enable input can be coupled to the output of the first comparator 211. A second enable input can be coupled to an output of the third comparator 215. Thus, the oscillator 217 can be turned on when the supply voltage ($V_+$) 231 is above the threshold as determined by the first comparator 211 and the reference pressure is within the reference full scale range as determined by the third comparator 215.

The counter 219 can be coupled to the output of the oscillator 231 and the output of the second comparator 213. Based on whether the drift compensated output from the adder 225 is less than or greater than the output of the reference amplifier 203 as determined by the second comparator 213, the counter 219 can increment or decrement accordingly.

The buffer 221 can receive the output of the counter 219 as an input. The buffer 221 can also have an enable input coupled to the output of the first comparator 211. The output of the buffer 221 can be received by the digital-to-analog converter 223. The output of the digital-to-analog converter 223 can be received by the adder 225. The adder 225 can then sum the output of the primary amplifier 227 with the output of the digital-to-analog converter 223, which represents the compensation value, to provide a zero drift compensated output.

The drift compensation circuit 200 can work to automatically zero the drift of the primary sensor 201 through an iterative process of updating the compensation value whenever the actual pressure is within the full scale range of the reference sensor 203. If the actual pressure is outside the full scale range of the reference sensor 203 or if the supply voltage ($V_+$) 231 falls below a threshold, the iterative update process is suspended. The counter 219, however, can have a memory, which can be sustained via a back-up voltage, allowing the output of the primary sensor 201 to be compensated based on the previously calculated compensation value.

In addition to sensor drift compensation systems, the present invention also provides methods for compensating sensor drift. An exemplary embodiment of the present invention provides a method of compensating sensor drift comprising exposing a primary sensor having a primary full scale range and a reference sensor having a reference full scale range less than the primary full scale range to an environment, measuring a property of the environment within the reference full scale range using the primary and reference sensors, and adjusting an output of the primary sensor until it is substantially equal to an output of the reference sensor. In some embodiments of the present invention, a method of compensating sensor drift can include steps corresponding to one or more of the functions performed by devices in the sensor drift compensation system or sensor drift compensation circuit discussed above. Additionally, as also discussed above, in various embodiments of the present invention, a processor and memory can be configured to perform one or more steps of the methods of compensating sensor drift disclosed herein.

In another embodiment, a reference full-scale range of a reference sensor may be less than about one percent (1%), about five percent (5%), about ten percent (10%), about twenty percent (20%), about fifty percent (50%) or the like of a primary full-scale range of a primary sensor.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions. Further, other modifications or embodiments as may be suggested by the teachings herein are particularly reserved as they fall within the breadth and scope of the claims appended hereto.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A system, comprising:
   a primary sensor having a primary full-scale range and configured to output a primary environmental condition signal indicative of an environmental condition;
   a reference sensor having a reference full-scale range and configured to output a reference environmental condition signal indicative of the environmental condition, wherein the reference full-scale range is less than the primary full-scale range; and
   a drift compensation system comprising:
      a comparator configured to:
         determine a first condition if a first value of the reference environment condition signal is within the reference full-scale range, and
         determine a second condition if a second value of the reference environment condition signal is greater than the reference full-scale range;
      counter circuitry configured to:
         iteratively generate a first condition-dependent compensation signal responsive to the determined first condition, wherein the first condition-dependent compensation signal is summed with the primary environmental condition signal to produce a drift-compensated output that iteratively tracks the reference environmental condition signal; and
         generate a second condition-dependent compensation signal responsive to the determined second condition, wherein the second condition-dependent compensation signal is summed with the primary environmental condition signal to produce the drift-compensated output, wherein the second condition-dependent compensation signal comprises an offset value, wherein the offset value is determined based on a difference between a threshold primary environmental condition signal and a threshold reference environmental condition signal, wherein the threshold signals are determined based on the reference environmental condition signal being substantially equal to the reference full-scale range.

2. The system of claim 1, wherein the drift compensation system further comprises a controllable oscillator in communication with the counter circuitry, wherein the drift compensation system is further configured to iteratively compensate the primary environmental condition signal so that the drift-compensated output is substantially equivalent to the reference environmental condition signal over the reference full-scale range.

3. The system of claim 1, wherein the drift compensation system is further configured to increase the second condition-dependent compensation signal responsive to the drift-compensated output signal being greater than the reference environmental condition signal.

4. The system of claim 1, wherein the drift compensation system is further configured to combine the primary environmental condition signal and the first condition-dependent compensation signal responsive to the reference environmental condition signal being in the reference full-scale range.

5. The system of claim 1, wherein the reference full-scale range is less than about ten percent (10%) of the primary full-scale range.

6. The system of claim 1, wherein each of the primary sensor and the reference sensor is a pressure sensor.

7. The system of claim 1, wherein each of the primary sensor and the reference sensor is a temperature sensor.

8. The system of claim 1, wherein the primary sensor and the reference sensor are co-located.

9. A method, comprising:
   outputting, by a primary sensor having a primary full-scale range, a primary environmental condition signal indicative of an environmental condition;
   outputting, by a reference sensor having a reference full-scale range, a reference environmental condition signal indicative of the environmental condition, wherein the reference full-scale range is within the primary full-scale range;
   determining a first condition if a first value of the reference environment condition signal is within the reference full-scale range, and iteratively generating a first condition-dependent compensation signal responsive to the determined first condition, wherein the first condition-dependent compensation signal is summed with the primary environmental condition signal to produce a drift-compensated output that iteratively tracks the reference environmental condition signal; and
   determining a second condition if a second value of the reference environment condition signal is greater than the reference full-scale range, and generating a second condition-dependent compensation signal responsive to the determined second condition, wherein the second condition-dependent compensation signal is summed with the primary environmental condition signal to produce the drift-compensated output, wherein the second condition-dependent compensation signal comprises an offset value, wherein the offset value is determined based on a difference between a threshold primary environmental condition signal and a threshold reference environmental condition signal, wherein the threshold signals are determined based on the reference environmental condition signal being substantially equal to the reference full-scale range.

10. The method of claim 9, wherein compensating the primary environmental condition signal includes iteratively modifying the drift-compensated output signal to be substantially equivalent to the reference environmental condition signal over the reference full-scale range.

11. The method of claim 9, wherein the second condition-dependent compensation signal is increased responsive to the drift-compensated output signal being greater than the reference environmental condition signal.

12. The method of claim 9, wherein the primary environmental condition signal and the first condition-dependent compensation signal are combined responsive to the reference environmental condition signal being in the reference full-scale range.

13. The method of claim 9, wherein the reference full-scale range is less than about ten percent (10%) of the primary full-scale range.

14. The method of claim 9, wherein each of the primary sensor and the reference sensor is a pressure sensor.

15. The method of claim 9, wherein each of the primary sensor and the reference sensor is a temperature sensor.

16. The method of claim 9, wherein the primary sensor and the reference sensor are co-located.

* * * * *